United States Patent [19]

Woodard et al.

[11] Patent Number: 4,911,535

[45] Date of Patent: Mar. 27, 1990

[54] REAR SCREEN PROJECTION WITH TWISTED NEMATIC CRYSTALS FOR IMPROVED VIEWING ANGLE

[75] Inventors: Thomas R. Woodard, Lago Vista; George R. Hare, Austin; John A. Jeffries, Marble Falls, all of Tex.

[73] Assignee: Texas Instruments Incorporated, Dallas, Tex.

[21] Appl. No.: 191,318

[22] Filed: May 9, 1988

[51] Int. Cl.⁴ ............................................. G02F 1/133
[52] U.S. Cl. ................................... 350/337; 350/334; 350/339 D
[58] Field of Search ............ 350/337, 334, 345, 339 D

[56] References Cited

U.S. PATENT DOCUMENTS 3,994,565  11/1976  Van Doorn et al. ............... 350/337
4,704,004  11/1987  Nosker ................................. 350/345

Primary Examiner—Stanley D. Miller
Assistant Examiner—Anita Pellman Gross
Attorney, Agent, or Firm—James T. Comfort

[57] ABSTRACT

The disclosure relates to a light source positioned behind a liquid crystal display, the output from the liquid crystal being projected onto a projection screen that has random polarization, thereby permitting a wide range of vision. The screen can be a part of the liquid crystal display by providing a frosted surface thereon which permits diffusion of the light emanating from the display.

10 Claims, 1 Drawing Sheet

REAR SCREEN PROJECTION WITH TWISTED NEMATIC CRYSTALS FOR IMPROVED VIEWING ANGLE

BACKGROUND OF THE INVENTION

1. Field of the Invention

This invention relates to liquid crystal displays and, more specifically, to liquid crystal displays having a relatively wide viewing angle and wherein light travels through the display from rear to front as opposed to entering from the front and being reflected in the display back to the front thereof.

2. Brief Description of the Prior Art

Twisted nematic crystal type liquid crystal displays usually have very narrow viewing angles. In these displays, polarized light is blocked by crystals which are twisted under the influence of an electric field. All light exiting the envelope will be polarized at the same angle. When the viewer moves off axis, due to the acute angle at which the light is travelling, such light reaching his eye will not have passed through the entire length of the twisted crystal so as to provide full attenuation. This is due to the thickness of the crystal material which is many molecules thick. The twist is imposed upon a stack of molecules, the twist angle varying from zero at the top and bottom of the stack to a full ninety degrees at the center of the stack. Also, some new designs use crystals that are twisted through more than one turn to an odd multiple of ninety degrees, such as, for example, 270 degrees. Accordingly, there may be more than one point at which the molecules are ninety degrees displaced from the molecules in the polarizing filter. By applying an electric field which causes crystals in a defined region to twist ninety degrees, polarized light can be selectively passed or blocked in selected different regions. The regions can be arranged in patterns, causing the appearance of an image. Accordingly, when the viewer moves off the display axis, light passing through the crystals to the viewer's eye no longer passes through the entire crystal or the region of ninety degree twist and is not fully attenuated, thereby causing the image to disappear.

Most improvements in viewing angle have been achieved through refinements in the dimensions of the display, by experimenting with various crystal structures, and by increasing the duty cycle of multiplexed driving circuitry.

Providing a crystal which is as thin as possible would appear to limit the amount of off axis light available, however, parallelism of the panes of glass comprising the envelope encompassing the liquid crystal becomes a process problem and limits the size of display that can be produced with acceptable yields.

Crystal structures with faster twisting response times and slower decay times usually improve contrast ratio for a given duty cycle. However, such structures have not provided much improvement in the above noted viewing angle problem.

Increasing of the duty cycle of the drive circuits can improve the contrast ratio on the axis. Therefore, as the viewer moves off axis, even though light attenuation decreases in the same proportion, the image remains along with viewable contrast at a greater angle. However, increase of the duty cycle also requires additional circuitry and additional power.

It is therefore readily apparent that prior art attempts to solve the problem of improving the viewing angle of liquid crystal displays have not met with adequate success.

SUMMARY OF THE INVENTION

In accordance with the present invention, there is provided a liquid crystal display which overcomes or minimizes the above noted problems of the prior art and provides a display which is viewable from a substantially larger angle off of the viewing axis than was possible in the prior art.

Briefly, in accordance with the present invention, there is provided a liquid crystal display using rear screen projection to create a randomly polarized image which can be viewed from any angle. Light is passed from the rear of the display through a polarizer and then through the crystal material contained in a glass envelope or panel having a front pane and a rear pane. The polarized light passing through the glass envelope and crystal, is then projected onto a screen, such as, for example, an etched surface, frosted or lenticular screen, which renders the polarized light randomly polarized. A lens is used between the crystal material and the screen to focus the image on the screen The screen may be located at any distance from the glass panel and the lens may be designed for magnification, if desired. If the screen is located very close to the glass panel, the lens is not required for focusing the image. Frosting the front pane or surface of the glass panel is the easiest manner to achieve a randomly polarized image. With the frosting, the display creates shadows on the screen and the light exits the glass panel with random polarization, to allow the image to remain visible from any angle.

The contrast ratio of the image will be slightly diminished from that of the maximum ratio of the polarized image viewed directly, however, the overall brightness can be improved since transmitted rather than reflected light is used. In addition, the front surface glare from incident light is eliminated. The display is visible in both high and low ambient light conditions.

When using a lens to focus the image on a screen, the configuration need not be coaxial. The use of prisms or mirrors will enable various configurations, such as locating a glass panel within an enclosure for protection, styling or convenience and designing an optical path to a screen located elsewhere. The screen need not be rigidly mounted in a fixed position, but rather, it could be designed to fold, roll or otherwise stow for transportable machines.

DESCRIPTION OF THE PREFERRED EMBODIMENTS

Figure 1:
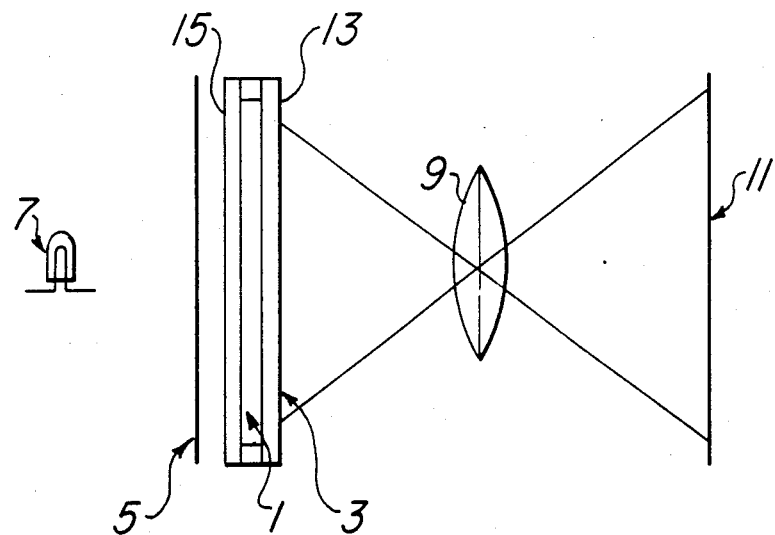
FIG. 1 is a schematic diagram of a projection system in accordance with the present invention.

Referring first to FIG. 1, there is shown a first embodiment in accordance with the present invention wherein magnification of the image is possible. The system includes a standard liquid crystal 1 without a rear deflector in the form of a thin rectangle having flat front and rear faces. The controllable elements of the liquid crystal are controlled in standard manner by electrical leads extending thereto (not shown). The liquid crystal is sealed within a glass envelope 3 having a front pane 13 and a rear pane 15 which covers both the front and rear faces of the liquid crystal to provide a protective shield for the liquid crystal. Positioned on the rear face side of the crystal and secured to the pane 15 of the glass envelope 3 with transparent glue or the like is a polarizer 5 with a light source 7 adjacent the polarizer and remote from the envelope 3. A lens system 9 is disposed between the envelope 3 and a light transmissive projection screen 11 of frosted glass to project images from the liquid crystal through the pane 13 and onto the screen.

In operation, the elements of the liquid crystal display 1 are selectively energized by the electrical leads thereto (not shown) whereby selected crystal elements become light transmissive and other crystal elements become light opaque. Light from the light source 7 then travels through the polarizer 5 and the light transmissive elements of the liquid crystal 1 as well as through the panes 13 and 15 of the glass envelope 3 and travel to the lens or lens system 9 as polarized light in the configuration of the display at the liquid crystal. The polarized light is projected by the lens system 9 onto the light transmissive screen 11 of frosted glass in magnified form, the amount of magnification depending upon the lens system configuration. The light then passes through the screen 11, diffusing and exiting the screen on the side thereof remote from the lens system with random polarization. Accordingly, the image at the screen 11 remains visible off the axis of the lens system due to the random polarization thereof.

Figure 2:
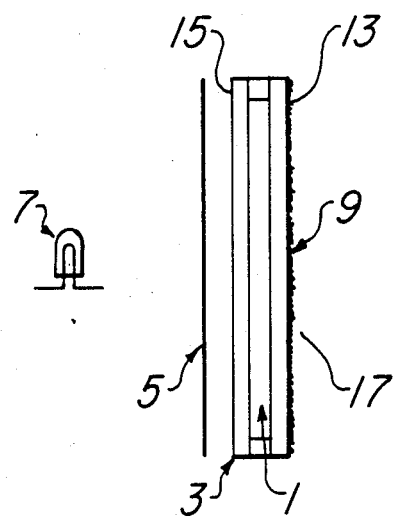
FIG. 2 is a schematic diagram of a system in accordance with the present invention without projection.

Referring now to FIG. 2, there is shown a second embodiment of the invention wherein magnification is not required. The system includes the same liquid crystal matrix display 1 as in FIG. 1 with the same glass envelope 3 having panes 13 and 15 sealing the liquid crystal therein. In addition, the polarizer 5 and light source 7 are the same as in FIG. 1. The difference is that the lens system 9 is eliminated from the system and the projection screen 11 is replaced by a frosted surface 17 formed on the pane 13 at the front side of the front glass envelope 3. The frosted surface must be the last element in the optical path. Since the conductors must be deposited on the inside surface, the frosted surface must be smooth. Therefore the frosting must be applied only on the front surface of the front glass envelope With the frosted surface 17 disposed on the front surface of the glass envelope 3, the polarized light will pass through the envelope portion at the rear of the liquid crystal 1 as well as through the selected elements of the liquid crystal. The polarized light will then pass through the frosted surface 17 on the front pane 13 of the glass envelope 3 and be changed from polarized to randomly polarized light in the process. The display will therefore again be viewable from a relatively large off axis angle or position, without magnification.

It can be seen that there has been provided a liquid crystal display which can be viewed and wherein the image is visible thereon from a substantial angle off axis as well as on axis, this provision being made available with only minimal change to the prior art liquid crystal display system.

A further alternative is to place a color filter or filters between the light source and the liquid crystal whereby different colors can be projected upon a screen. A still further alternative is to provide a source of multiple colors of light, such as, for example, by using colored light sources behind the panel which provide good illumination over the whole display or a Y-shaped light pipe with a different color light source and a modulator at each of the top legs of the Y whereby one light source or plural light sources simultaneously can project light from the bottom portion of the Y and onto the display. Each of these alternatives will replace the light source of the embodiments described hereinabove.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:
1. A display system comprising, in combination:
 (a) a liquid crystal display member having portions thereof selectively light transmissive;
 (b) light means to cause polarized light to impinge upon said selectively light transmissive portions;
 (c) a light transmissive member responsive to said polarised light to cause said polarized light to become unpolarized; and
 (d) a lens system disposed between said liquid crystal member and said light transmissive member to focus and magnify light passing from said liquid crystal to said light transmissive member.

2. The display of claim 1 wherein said light transmissive member is disposed on the side of said liquid crystal display opposite said light means.

3. The display of claim 1 wherein said light transmissive member is responsive to light passing through said liquid crystal display.

4. The display of claim 1 wherein said light transmissive member is a frosted glass member.

5. The display of claim 2 wherein said light transmissive member is a frosted glass member.

6. The display of claim 3 wherein said light transmissive member is a frosted glass member.

7. A display system comprising, in combination:
 (a) light means to provide a source of polarized light;
 (b) a liquid crystal display member having portions thereof selectively light transmissive, for selectively transmitting said polarized light therethrough;
 (c) a light transmissive member receiving said polarized light to and transmitting said light therethrough as randomly polarized light; and
 (d) a lens system disposed between said liquid crystal display member and said light transmissive member to focus and magnify light passing from said liquid crystal to said light transmissive member.

8. The display of claim 7 wherein said light transmissive member is a frosted glass member.

9. The display of claim 7 further including a glass member secured to said liquid crystal display, said light transmissive member being a part of said glass member.

10. The display of claim 8 further including a glass member secured to said liquid crystal display, said light transmissive member being a part of said glass member.

* * * * *